(12) United States Patent
Zhao et al.

(10) Patent No.: US 6,645,560 B2
(45) Date of Patent: Nov. 11, 2003

(54) OXIDATION RESISTANT COATINGS FOR NIOBIUM-BASED SILICIDE COMPOSITES

(75) Inventors: Ji-Cheng Zhao, Niskayuna, NY (US); Melvin Robert Jackson, Niskayuna, NY (US); Bernard Patrick Bewlay, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/315,731

(22) Filed: Dec. 10, 2002

(65) Prior Publication Data

US 2003/0124342 A1 Jul. 3, 2003

Related U.S. Application Data

(62) Division of application No. 09/775,737, filed on Feb. 2, 2001, now Pat. No. 6,521,356.

(51) Int. Cl.[7] .............................. B05D 3/02; B05D 1/36; B05D 1/00; C23C 16/00; C23C 14/00
(52) U.S. Cl. ................. 427/376.1; 427/376.6; 427/376.7; 427/376.8; 427/383.1; 427/383.7; 427/436; 427/250; 427/255.28; 427/455; 427/404; 427/405; 427/402
(58) Field of Search ..................... 427/376.1, 376.6, 427/376.7, 376.8, 383.1, 383.7, 436, 250, 255.28, 455, 404, 405, 402

(56) References Cited

U.S. PATENT DOCUMENTS

| | | | |
|---|---|---|---|
| 4,980,244 A | | 12/1990 | Jackson |
| 5,595,616 A | | 1/1997 | Berczik |
| 5,721,061 A | * | 2/1998 | Jackson et al. ............. 428/641 |
| 5,932,033 A | | 8/1999 | Jackson et al. |
| 5,942,055 A | | 8/1999 | Jackson et al. |
| 6,280,857 B1 | * | 8/2001 | Sommer et al. |
| 6,419,765 B1 | * | 7/2002 | Jackson et al. |

* cited by examiner

*Primary Examiner*—Michael Barr
(74) *Attorney, Agent, or Firm*—Robert P. Santandrea; Patrick K. Patnode

(57) ABSTRACT

An environmentally resistant coating (34) for improving the oxidation resistance of a niobium-based refractory metal intermetallic composite (Nb-based RMIC) at high temperatures, the environmentally resistant coating (34) comprising silicon, titanium, chromium, and niobium. The invention includes a turbine system (10) having turbine components (11) comprising at least one Nb-based RMIC, the environmentally resistant coating (34) disposed on a surface (33) of the Nb-based RMIC, and a thermal barrier coating (42) disposed on an outer surface (40) of the environmentally resistant coating (34). Methods of making a turbine component (11) having the environmentally resistant coating (34) and coating a Nb-based RMIC substrate (32) with the environmentally resistant coating (34) are also disclosed.

9 Claims, 4 Drawing Sheets

OXIDATION RESISTANT COATINGS FOR NIOBIUM-BASED SILICIDE COMPOSITES

This is a division of application Ser. No. 09/775,737, filed Feb. 2, 2001 now U.S. Pat. No. 6,521,356.

The United States Government may have certain rights in this invention pursuant to Contract No. F33615-98-C-5215, awarded by the United States Air Force, United States Department of Defense.

BACKGROUND OF THE INVENTION

The present invention relates to turbine systems. More particularly, the invention relates to components of such turbine systems. Still more particularly, the invention relates to turbine components formed from a niobium-based refractory metal intermetallic composite. Finally, the invention relates to environmentally resistant coatings for such turbine components.

Turbine systems, such as, but not limited to, aeronautical turbines, land-based, turbines, marine-based turbines, and the like, and their components (hereinafter referred to as "turbine components") have typically been formed from nickel (Ni) based materials, which are often referred to as Ni-based superalloys. Turbine components formed from these Ni-based superalloys exhibit desirable chemical and physical properties under the high temperature, high stress, and high-pressure conditions generally encountered during turbine operation. For example, the highest surface temperatures of state-of-the-art jet engine turbine airfoils reach as high as about 2100° F. (about 1150° C.), or about 85% of the melting temperature ($T_m$) of most of the Ni-based superalloys.

To date, the Ni-based superalloys have provided the desired level of performance for turbine system applications, causing the development of such Ni-based superalloys to be widely explored. As a result of such extensive study, the field has matured and few significant improvements have been realized in this area in recent years. In the meantime, efforts have been made to develop alternative turbine component materials.

These alternative materials include niobium (Nb) based refractory metal intermetallic composites (hereinafter referred to as "Nb-based RMICs"). Most Nb-based RMICs have melting temperatures of greater than about 3100° F. (about 1700° C.). If Nb-based RMICs can be used at about 80% of their melting temperatures, they will have potential use in applications in which the temperature exceeds the current service limit of Ni-based superalloys.

Nb-based RMICs comprising niobium (Nb), silicon (Si), titanium (Ti), hafnium (Hf), chromium (Cr), and aluminum (Al) are among the materials that have been proposed for turbine component applications in which Ni-based superalloys are presently used. These Nb-based RMICs exhibit a high temperature capability which exceeds that of the Ni-based superalloys that are currently used in such applications. Exemplary Nb-based RMICs are described by Jackson and Bewlay (U.S. Pat. Nos. 5,932,033 and 5,942,055), and more recently by Jackson, Bewlay, and Zhao in U.S. Patent applications titled "Niobium-Silicide Based Composites Resistant to High Temperature Oxidation" (Ser. No. ; filed Dec. 13, 2000) and "Niobium-Silicide Based Composites Resistant to Low Temperature Pesting" (Ser. No. 09/735,769; filed Dec. 13, 2000).

Although the Nb-based RMICs show potential for use as next-generation turbine components having service temperatures that are significantly greater than those of current Ni-based superalloy components, oxidation of such turbine components remains a concern. At temperatures in the range between about 2000° F. and about 2500° F. (between about 1090° C. and about 1370° C.), refractory materials can undergo rapid oxidation. While a slow-growing oxide scale can form on Nb-based RMIC's at this temperature, it is typically not a protective oxide scale. Another type of oxidation known as 'pesting' occurs at intermediate temperatures (e.g., between about 1400° F. and about 1800° F.). Pesting is a phenomenon that is characterized by the disintegration of a material into pieces or powders after exposure to air at intermediate temperatures. Refractory metals, particularly molybdenum, exhibit poor resistance to pesting oxidation.

While significant progress has been made in improving the oxidation performance of Nb-based RMICs, it is desirable to provide coatings for turbine components fabricated from these materials in order to ensure long lifetimes at service temperatures of 2000° F. to 2500° F. Therefore, what is needed is a turbine system having Nb-based RMIC components having coatings that will provide increased resistance of the components to oxidation at temperatures in the range between about 2000° F. and about 2500° F. and increased resistance to pesting at temperatures between about 1400° F. an about 1800° F. What is also needed is an environmentally resistant coating for Nb-based RMICs, which will enhance oxidation resistance at high temperatures and pesting resistance at intermediate temperatures.

BRIEF SUMMARY OF THE INVENTION

The present invention meets these needs and others by providing a turbine system that includes Nb-based RMIC components having coatings that increase oxidation resistance at high temperatures and resistance to pesting at intermediate temperatures. The present invention also provides an environmentally resistant coating for Nb-based RMICs that exhibit improved oxidation resistance at high temperatures and resistance to pesting at intermediate temperatures. In addition, methods for making a coated Nb-based RMIC turbine component and coating a Nb-based RMIC are also disclosed.

Accordingly, one aspect of the present invention is to provide a turbine system having at least one turbine component. The turbine component comprises: a niobium-based refractory metal intermetallic composite (Nb-based RMIC) comprising titanium, hafnium, silicon, chromium, and niobium; and an environmentally resistant coating disposed on a surface of the niobium-based refractory metal intermetallic composite, the environmentally resistant coating comprising silicon, titanium, chromium, and niobium.

A second aspect of the invention is to provide an environmentally resistant coating for a niobium-based refractory metal intermetallic composite (Nb-based RMIC) substrate. The environmentally resistant coating comprises between about 43 and 67 atomic percent silicon; between about 2 and about 25 atomic percent titanium; between about 1 and about 25 atomic percent chromium; and a balance of niobium.

A third aspect of the invention is to provide a turbine system having at least one turbine component. The turbine component comprises: a niobium-based refractory metal intermetallic composite (Nb-based RMIC), said niobium-based refractory metal intermetallic composite comprising titanium, hafnium, silicon, chromium, and a balance of niobium; an environmentally resistant coating disposed on a surface of the niobium-based refractory metal intermetallic composite substrate; and a thermal barrier coating disposed on an outer surface of the environmentally resistant coating. The environmentally resistant coating comprises between about 43 and 67 atomic percent silicon; between about 2 and about 25 atomic percent titanium; between about 1 and about 25 atomic percent chromium; and a balance of niobium.

A fourth aspect of the invention is to provide a method of making a turbine component comprising a niobium-based refractory metal intermetallic composite (Nb-based RMIC) and having an environmentally resistant coating disposed on the surface of the component, The environmentally resistant coating comprises silicon, titanium, chromium, and niobium. The method comprises the steps of providing a niobium-based refractory metal intermetallic composite substrate formed into the turbine component and depositing the environmentally resistant coating onto the surface of the component.

Finally, a fifth aspect of the present invention is to provide a method of coating a niobium-based refractory metal intermetallic composite (Nb-based RMIC) substrate with an environmentally resistant coating. The environmentally resistant coating comprises silicon, titanium, chromium, and a balance of niobium. The method comprises the steps of providing a niobium-based refractory metal intermetallic composite substrate and depositing the environmentally resistant coating onto the surface of the niobium-based refractory metal intermetallic composite substrate.

These and other aspects, advantages, and salient features of the invention will become apparent from the following detailed description, the accompanying drawings, and the appended claims.

DETAILED DESCRIPTION OF THE INVENTION

Figure 1:
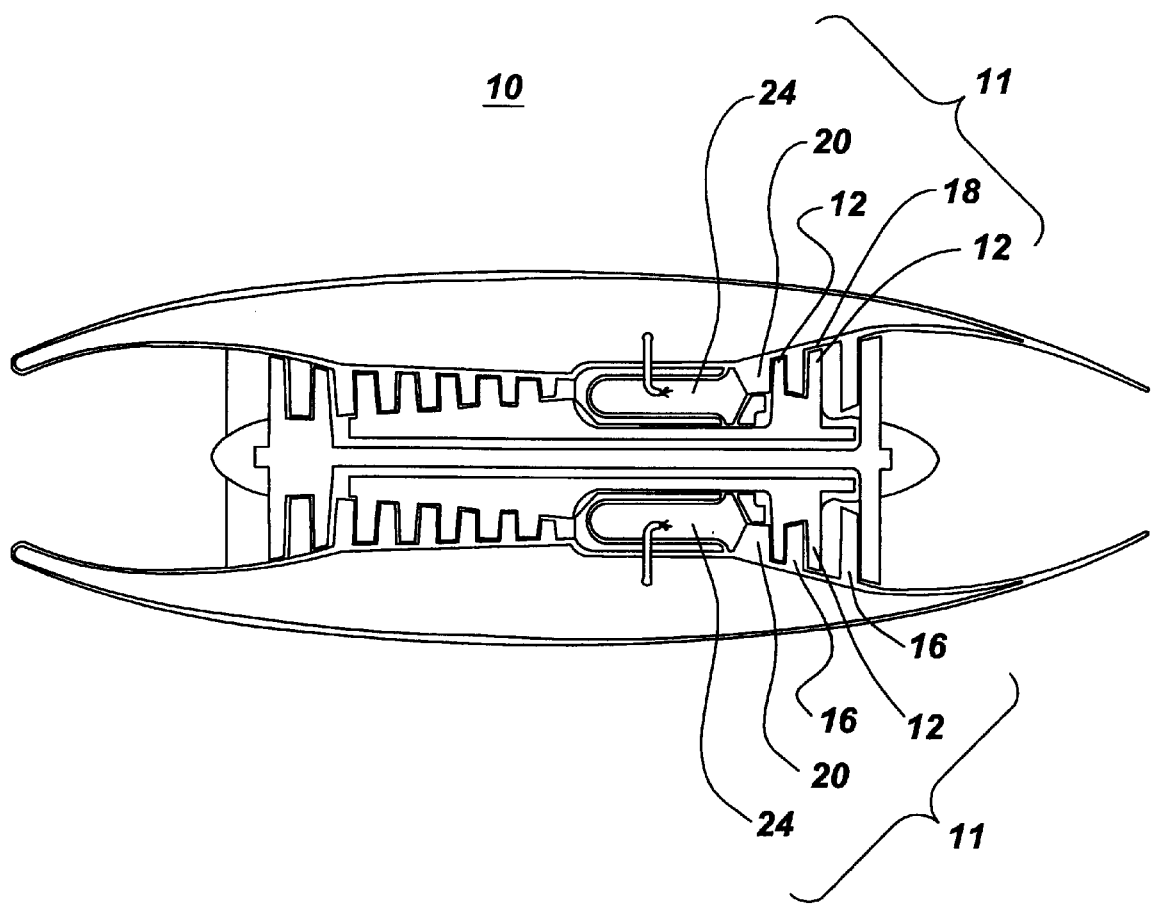
FIG. 1 is a schematic representation of a turbine system.

In the following detailed description, like reference characters designate like or corresponding parts throughout the several views shown in the figures. It is also understood that terms such as "top," "bottom," "outward," "inward," and the like are words of convenience and are not to be construed as limiting terms.

Referring to the drawings in general and to FIG. 1 in particular, it will be understood that the illustrations are for the purpose of describing a preferred embodiment of the invention and are not intended to limit the invention thereto. FIG. 1 is a schematic diagram of a turbine system 10 of the present invention. The turbine system 10 may either be an aircraft engine; a land-based turbine system, such as those widely used for power generation; or a marine-based turbine.

The turbine system 10 of the present invention comprises a number of turbine components 11 that are subject to temperatures of about 2100° F. (about 1150° C.) or greater during normal operation. These turbine components 11 include, but are not limited to: rotating blades 12, vanes 16, shrouds 18, nozzles 20, combustors 24, and the like. Such turbine components 11 are formed from niobium-based refractory metal intermetallic composites (hereinafter referred to as "Nb-based RMICs") and have service temperatures that are either at the limit of or exceed those of similar components formed from nickel-based superalloys that are currently in use.

In the present invention, the Nb-based RMICs that are used to form the turbine components 11 of the turbine system 10 comprise titanium, hafnium, silicon, chromium, and niobium. The Nb-based RMICs preferably each comprise between about 19 atomic percent and about 24 atomic percent titanium; between about 1 atomic percent and about 5 atomic percent hafnium; between about 11 and about 22 atomic percent silicon; between about 5 and about 14 atomic percent chromium; and a balance of niobium. More preferably, the Nb-based RMICs each comprise between about 19 and about 24 atomic percent titanium; between about 1 and about 5 atomic percent hafnium; up to about 7 atomic percent tantalum; between about 11 and about 22 atomic percent silicon; up to about 6 atomic percent germanium; up to about 12 atomic percent boron; between about 5 and about 14 atomic percent chromium; up to about 4 atomic percent iron; up to about 4 atomic percent aluminum; up to about 3 atomic percent tin; up to about 3 atomic percent tungsten; up to about 3 atomic percent molybdenum; and a balance of niobium. Most preferably, silicon, germanium, and boron together comprise between about 11 and about 24 atomic percent of the Nb-based RMIC, iron and chromium together comprise between about 5 and about 14 atomic percent of the Nb-based RMIC, and a ratio of a sum of atomic percentages of niobium and tantalum present in the Nb-based RMIC to a sum of atomic percentages of titanium and hafnium in the Nb-based RMIC has a value of between about 1.4 and about 2.2; i.e., 1.4<(Nb+Ta):(Ti+Hf) <2.2.

In the present invention, oxidation of the turbine components 10 formed from Nb-based RMICs is a concern, as such materials can undergo rapid oxidation at temperatures in the range between about 2000° F. and about 2500° F. (between about 1090° C. and about 1370° C. The slow-growing oxide scale that usually forms on Nb-based RMIC's at these temperatures is typically not a protective oxide scale. In addition, another type of oxidation, known as 'pesting,' occurs at intermediate temperatures (e.g., between about 1400° F. an about 1800° F.). Pesting is a phenomenon that is characterized by the disintegration of a material into pieces or powders after exposure at intermediate temperatures. Refractory metals, particularly molybdenum, exhibit poor resistance to pesting oxidation.

Figure 2:
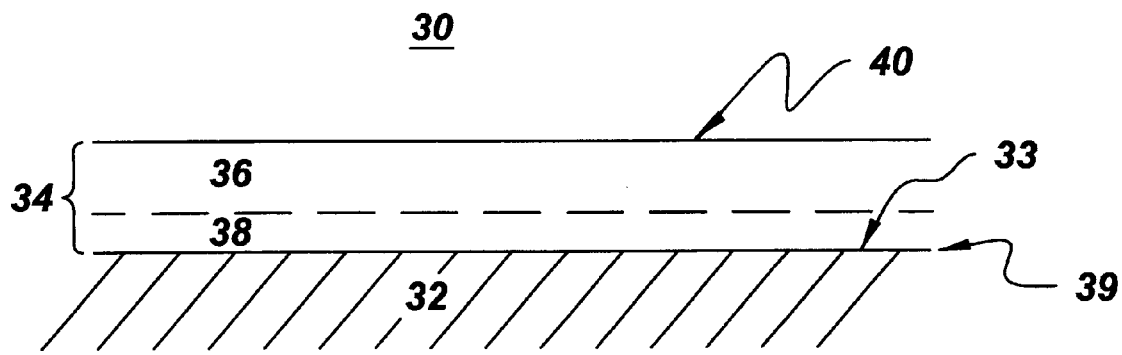
FIG. 2 is a schematic cross-sectional view of an environmentally resistant coating of the present invention deposited on a niobium-based refractory metal intermetallic composite substrate.

To improve the oxidation and pesting resistance of the turbine components 11 that are formed from Nb-based RMICs, the present invention includes an environmentally resistant coating 34 disposed on a surface 33 of the Nb-based RMIC substrate 32 to form a coated Nb-based RMIC article 30, such as a coated turbine component, as shown in FIG. 2. The environmentally resistant coating 34 has a thickness of between about 10 microns and about 200 microns and comprises silicon, titanium, chromium, and niobium. It is desirable that the environmentally resistant coating 34 comprise between about 43 and 67 atomic percent silicon; between about 2 and about 25 atomic percent titanium; between about 1 and about 25 atomic percent chromium; and a balance of niobium. The environmentally resistant coating 34 may further comprise at least one metal selected from the group consisting of boron, iron, and tin, wherein the total amount of these elements comprises less than about 5 atomic percent of the environmentally resistant coating. In addition, the environmentally resistant coating 34 may further comprise up to about 20 atomic percent germanium, where germanium replaces silicon. The environmentally resistant coating 34 may also include up to about 3 atomic percent of at least one element selected from the group consisting of hafnium, tantalum, aluminum, tungsten, and molybdenum.

The environmentally resistant coating 34 preferably comprises between about 50 and about 67 atomic percent silicon, between about 8 and about 16 atomic percent titanium, between about 4 and about 12 atomic percent chromium, and a balance of niobium. Most preferably, the environmentally resistant coating 34 comprises about 66 atomic percent silicon, about 10 atomic percent titanium, about 5 atomic percent chromium, and a balance of niobium.

The phase $Nb_{1-x-y}Ti_xCr_ySi_2$ phase, in which $1>(x+y)\geqq0$, comprises at least about 50 volume percent of the environmentally resistant coating. The phase $Nb_{1-x-y}Ti_xCr_ySi_2$ may be concentrated in an outer region 36 adjacent to the outer surface 40 of the environmentally resistant coating 34. Other phases, such as a $Ti_{5-z}Nb_zSi_4$ phase, and a $Ti_{5-w}Nb_wSi_3$ phase, where 5>z, w≧0, may also be present in the environmentally resistant coating 34. These phases may also contain small amounts of chromium and hafnium, and may be concentrated in an interfacial zone 38 adjacent to the interface 39 between the environmentally resistant coating 34 and of the Nb-based RMIC substrate 32.

The environmentally resistant coating 34 may be applied to a Nb-based RMIC substrate 32, such as a turbine component 11, by one of a number of deposition techniques. One such technique is to dip the Nb-based RMIC substrate 32 into a slurry comprising a viscous binder and containing silicon, chromium, and titanium. After dipping, the Nb-based RMIC substrate 32 is then heat treated at a temperature of at least about 1200° C., preferably for at least about one hour, to form the environmentally resistant coating 34. During the heat treatment at 1200° C., the slurry reacts with niobium in the Nb-based RMIC substrate 32 to form the environmentally resistant layer of the present invention. An additional heat treatment at 1600° C. for 10 hours may be used to consolidate the environmentally resistant coating 34. Other methods, including ion plasma deposition, vacuum plasma spraying, high velocity oxy-flame spraying, physical vapor deposition, chemical vapor deposition, and combinations thereof, can be used to deposit silicon, chromium, titanium, and niobium on the Nb-based RMIC substrate 32. The environmentally resistant coating 34 is then formed by heat treating the Nb-based RMIC substrate 32 at a temperature of at least about 1200° C., preferably for at least about one hour.

Figure 3:
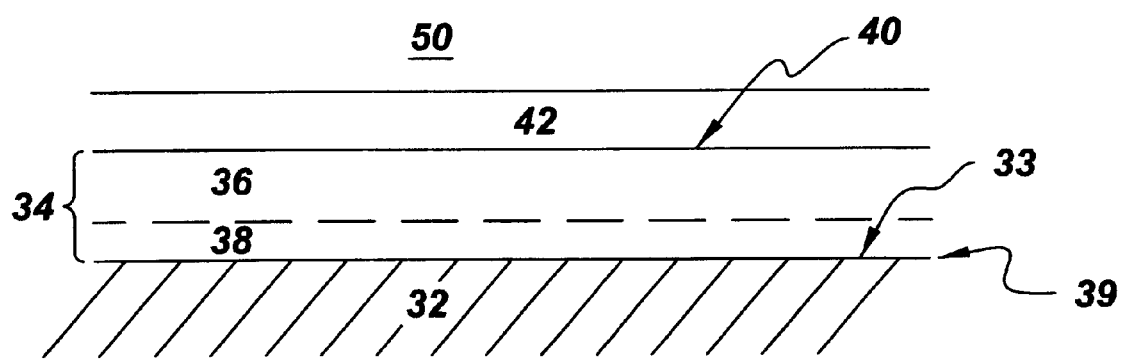
FIG. 3 is a schematic cross-sectional view of a thermal barrier coating and an environmentally resistant coating of the present invention deposited on a niobium-based refractory metal intermetallic composite substrate.

Preferably, a thermal barrier coating 42 may be applied in addition to the environmentally resistant coating 34 to provide a thermal barrier coated Nb-based RMIC article 50, such as a coated turbine component, as shown in FIG. 3. The thermal barrier coating 42 is deposited on the outer surface 40 of the environmentally resistant coating 34. The thermal barrier coating 42 has a thickness of between about 50 microns and about 400 microns, and may comprise: zirconia; zirconia stabilized by the addition of other metals, such as yttrium, magnesium, cerium, and the like; zircon; mullite; combinations thereof; or other refractory materials having similar properties.

Once the thermal barrier coating 42 and environmentally resistant coating 34 have been applied to a turbine component 11, the thermal barrier coated turbine component 50 may installed in the turbine system 10.

The following example serves to illustrate the features and advantages of the present invention.

EXAMPLE 1

Figure 4:
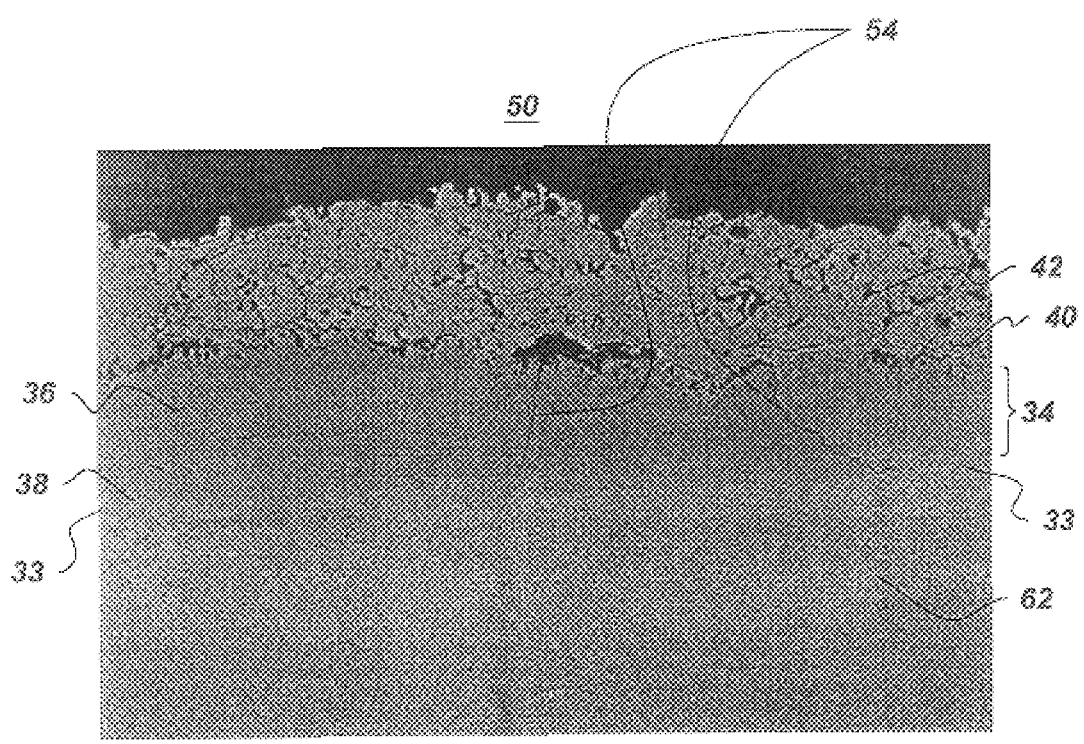
FIG. 4 is a scanning electron microscope (SEM) image of a thermal barrier coating and an environmentally resistant coating of the present invention deposited on a Nb-based RMIC substrate.

Nb-based RMIC test buttons were coated with the environmentally resistant coating of the present invention. A thermal barrier coating of yttria-stabilized zirconia (YSZ) was deposited on top of the environmentally resistant coating using an air plasma spraying method. A representative microstructure of a test button 62 coated with the environmentally resistant coating 34 of the present invention and the YSZ thermal barrier coating 42 is shown in FIG. 4. The environmentally resistant coating 34 shown in FIG. 4 has a composition of about 66 atomic percent silicon, about 10 atomic percent titanium, about 5 atomic percent chromium, and about 19 atomic percent niobium. The phase $Nb_{1-x-y}Ti_xCr_ySi_2$ is concentrated in an outer region 36 adjacent to the outer surface 40 of the environmentally resistant coating 34. The interfacial zone 38 of the environmentally resistant coating 34 adjacent to the substrate test button 62 contains a $Ti_{5-x}Nb_xSi_4$ phase and a $Ti_{5-x}Nb_xSi_3$ phase. The interaction zone 38 has a composition of about 44 atomic percent silicon, about 19 atomic percent titanium, about 5 atomic percent chromium, about 1 atomic percent hafnium, and about 31 atomic percent niobium. Due to the brittle nature of the $Nb_{1-x-y}Ti_xCr_ySi_2$ phase and the difference in coefficients of thermal expansion (CTE) between the different phases, cracks 54 have formed in the environmentally resistant coating. These cracks 54 are self-healing; i.e., they do not propagate further with additional high temperature exposure or thermal cycling.

Figure 5:
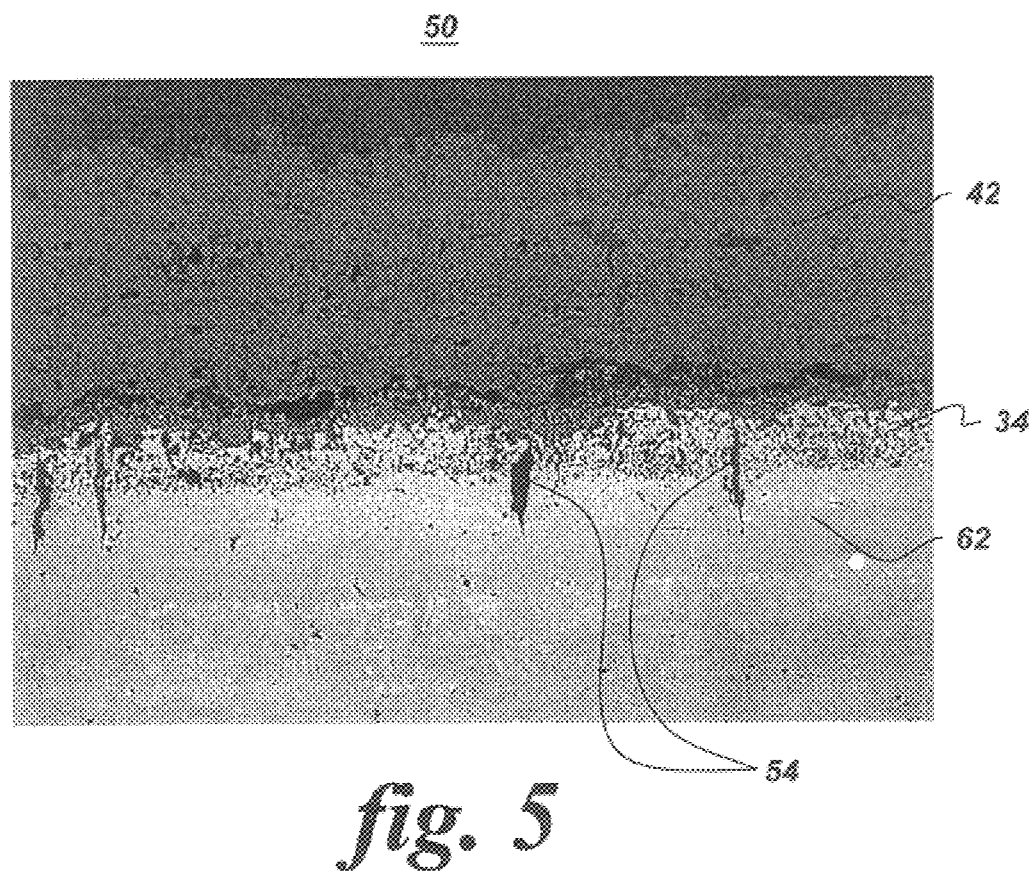
FIG. 5 is a SEM image of a thermal barrier coating and an environmentally resistant coating of the present invention deposited on a Nb-based RMIC substrate following cyclic oxidation tests to 2500° F. for 100 cycles.

The Nb-based RMIC test buttons 62 coated with the environmentally resistant coating 34 of the present invention and the YSZ thermal barrier coating 42 were subjected to furnace cycle tests (FCT) to 1600° F., 2400° F., and 2500° F. During the furnace cycle tests, the coated Nb-based RMIC test buttons were heated to the high temperature for 1 hour in air and then removed from the furnace and cooled for 10 minutes with blowing air. The specimens were then re-loaded into the high temperature furnace. These tests were repeated for 100 times, or cycles, for each test temperature. A post-FCT examination of the coated Nb-based RMTC test buttons was carried out using scanning electron microscopy (SEM). A representative SEM image of a cross section of a coated Nb-based RMIC test button that had been subjected to a furnace cycle test to 2500° F. for 100 cycles is shown in FIG. 5. As can be seen in FIG. 5, the thermal barrier coating 42 and environmentally resistant coating 34 remained intact and still adhered to the Nb-based RMIC test button 62 substrate. In a series of furnace cycle tests, no internal oxidation of the Nb-based RMIC test button 62 substrates was observed during the SEM examination. In addition, no pesting of the Nb-based RMIC test button 62 substrates was observed at any of the test temperatures. The furnace cycle tests thus show that the susceptibility of Nb-based RMICS to both high temperature oxidation and pesting at intermediate temperatures is significantly reduced by the presence of the environmentally resistant coating of the present invention and a thermal barrier coating.

While various embodiments are described herein, it will be apparent from the specification that various combinations of elements, variations, or improvements therein may be made by those skilled in the art, and are thus within the scope of the invention. For example, the method of depositing the environmentally resistant coating may include any combination of the various methods described herein. In addition, the thermal barrier coating may comprise other refractory materials other than those described herein. Also, it is contemplated that Nb-based RMICs having the environmentally resistant coating may find use other applications in which oxidation resistance at high temperature materials is a desired property.

What is claimed is:

1. A method of making a turbine component comprising a niobium-based refractory metal intermetallic composite and having an environmentally resistant coating disposed on the surface of the component, the environmentally resistant coating comprising silicon, titanium, chromium, and niobium, the method comprising the steps of:
    a) providing a niobium-based refractory metal intermetallic composite substrate formed into the turbine component, wherein the niobium-based refractory metal intermetallic composite comprises one of:
        i) between about 19 atomic percent and about 24 atomic percent titanium, between about 1 atomic percent and about 5 atomic percent hafnium, between about 11 and about 22 atomic percent silicon, between about 5 and about 14 atomic percent chromium, and a balance of niobium; and
        ii) between about 19 and about 24 atomic percent titanium; between about 1 and about 5 atomic percent hafnium; up to about 7 atomic percent tantalum; between about 11 and about 22 atomic percent silicon; up to about 6 atomic percent germanium; up to about 12 atomic percent boron; between about 5 and about 14 atomic percent chromium; up to about 4 atomic percent iron; up to about 4 atomic percent aluminum; up to about 3 atomic percent tin; up to about 3 atomic percent tungsten; up to about 3 atomic percent molybdenum; and a balance of niobium; and
    b) depositing the environmentally resistant coating onto the surface of the component.

2. The method of claim 1, wherein the step of depositing the environmentally resistant coating (34) comprises:
    a) providing a slurry, the slurry comprising a viscous binder and containing silicon, chromium, and titanium;
    b) dipping the niobium-based refractory metal intermetallic composite substrate (32) into the slurry, whereby the niobium-based refractory metal intermetallic composite substrate (32) is coated by the slurry; and
    c) heat treating the niobium-based refractory metal intermetallic composite substrate (32) for at least about one hour at a temperature of at least about 1200° C.

3. The method of claim 1, wherein the step of depositing the environmentally resistant coating (34) comprises:
    a) depositing silicon, titanium, chromium, and niobium on the niobium-based refractory metal intermetallic composite substrate (32) using a deposition method selected from the group consisting of ion plasma deposition, vacuum plasma spraying, high velocity oxy-fuel spraying, physical vapor deposition, and chemical vapor deposition; and
    b) heat treating the niobium-based refractory metal intermetallic composite substrate (32) for at least about one hour at a temperature of at least about 1200° C.

4. The method of claim 1, further comprising the step of depositing a thermal barrier coating (42) over the environmentally resistant coating (34).

5. The method of claim 1, wherein the environmentally resistant coating (34) comprises between about 43 and 67 atomic percent silicon, between about 2 and about 25 atomic percent titanium, between about 1 and about 25 atomic percent chromium, and a balance of niobium.

6. A method of coating a niobium-based refractory metal intermetallic substrate with an environmentally resistant coating, the environmentally resistant coating comprising silicon, titanium, chromium, and niobium, the method comprising the steps of:
    a) providing a niobium-based refractory metal intermetallic composite substrate; and
    b) depositing the environmentally resistant coating onto the surface of the niobium-based refractory metal intermetallic composite substrate, wherein the environmentally resistant coating comprises a $Nb_{1-x-y}Ti_xCr_ySi_2$ phase, wherein $1 > (x+y) \geq 0$, and wherein the $Nb_{1-x-y}Ti_xCr_ySi_2$ phase comprises at least 50 volume percent of said environmentally resistant coating.

7. The method of claim 6, wherein the step of depositing the environmentally resistant coating (34) comprises:
    a) providing a slurry, the slurry comprising a viscous binder and containing silicon, chromium, and titanium;
    b) dipping the niobium-based refractory metal intermetallic composite substrate (32) into the slurry, whereby the niobium-based refractory metal intermetallic composite substrate (32) is coated by the slurry; and
    d) heat treating the niobium-based refractory metal intermetallic composite substrate (32) for at least about one hour at a temperature of at least about 1200° C.

8. The method of claim 6, wherein the step of depositing the environmentally resistant coating (34) comprises:
    a) depositing silicon, titanium, chromium, and niobium on the niobium-based refractory metal intermetallic composite substrate using a deposition method selected from the group consisting of ion plasma deposition, vacuum plasma spraying, high velocity oxy-fuel spraying, physical vapor deposition, and chemical vapor deposition; and
    b) heat treating the niobium-based refractory metal intermetallic composite substrate (32) for at least about one hour at a temperature of at least about 1200° C.

9. The method of claim 6, wherein the environmentally resistant coating (34) comprises between about 43 and 67 atomic percent silicon, between about 2 and about 25 atomic percent titanium, between about 1 and about 25 atomic percent chromium, and a balance of niobium.

* * * * *